United States Patent
Guo

(10) Patent No.: US 8,652,685 B2
(45) Date of Patent: Feb. 18, 2014

(54) METHOD OF MAKING AN ELECTROCHEMICAL CELL WITH A CATALYTIC ELECTRODE INCLUDING MANGANESE DIOXIDE

(75) Inventor: Jingdong Guo, Westlake, OH (US)

(73) Assignee: Eveready Battery Co., Inc., St. Louis, MO (US)

( * ) Notice: Subject to any disclaimer, the term of this patent is extended or adjusted under 35 U.S.C. 154(b) by 366 days.

(21) Appl. No.: 13/014,041

(22) Filed: Jan. 26, 2011

(65) Prior Publication Data

US 2011/0189590 A1 Aug. 4, 2011

Related U.S. Application Data

(60) Provisional application No. 61/299,576, filed on Jan. 29, 2010.

(51) Int. Cl.
*H01M 8/00* (2006.01)

(52) U.S. Cl.
USPC .......................................... 429/224; 429/535

(58) Field of Classification Search
USPC ................................. 429/224, 535
See application file for complete search history.

(56) References Cited

U.S. PATENT DOCUMENTS

| | | | |
|---|---|---|---|
| 2,956,860 A | 10/1960 | Welsh | |
| 3,959,021 A | 5/1976 | Nishino et al. | |
| 4,277,360 A | 7/1981 | Mellors et al. | |
| 4,433,035 A | 2/1984 | Wiacek | |
| 4,590,059 A | 5/1986 | Mellors | |
| 4,595,643 A | 6/1986 | Koshiba et al. | |
| 5,308,711 A | 5/1994 | Passaniti et al. | |
| 5,378,562 A | 1/1995 | Passaniti et al. | |
| 5,674,644 A | 10/1997 | Nazri | |
| 6,261,709 B1 | 7/2001 | Passaniti et al. | |
| 6,428,931 B1 | 8/2002 | Golovin | |
| 6,632,557 B1 | 10/2003 | Curelop et al. | |
| 6,780,347 B2 | 8/2004 | Ndzebet | |
| 7,338,582 B2 | 3/2008 | Suzuki et al. | |

(Continued)

FOREIGN PATENT DOCUMENTS

| | | | |
|---|---|---|---|
| JP | 51071299 A | 6/1976 | |
| WO | 0013790 A1 | 3/2000 | |

(Continued)

OTHER PUBLICATIONS

Verma et al. "Manganese dioxide as a cathode catalyst for a direct alcohol or sodium borohydride fuel cell with a flowing alkaline electrolyte." Journal of Power Sources: 141, 30-34 (2005).*

(Continued)

*Primary Examiner* — Carlos Barcena
*Assistant Examiner* — Michael Dignan
(74) *Attorney, Agent, or Firm* — Russell H. Toye, Jr.

(57) ABSTRACT

The invention is a process for making an electrochemical cell with a catalytic electrode including a catalyst made by a solution precipitation process via an oxidation-reduction reaction between water-soluble oxidizing and reducing agents, at least one of which includes manganese. The reaction is carried out at less than 65° C., preferably with little or no heating. The oxidizing agent does not have a cation that is reduced in the reaction, and the reducing agent does not have an anion that is reduced in the reaction.

26 Claims, 4 Drawing Sheets

(56) References Cited

U.S. PATENT DOCUMENTS

| | | | |
|---|---|---|---|
| 2006/0264325 A1 | 11/2006 | Wu | |
| 2007/0111095 A1* | 5/2007 | Padhi et al. | ................ 429/224 |
| 2008/0155813 A1 | 7/2008 | Dopp et al. | |
| 2008/0176059 A1 | 7/2008 | Benoit et al. | |
| 2009/0214911 A1 | 8/2009 | Ohashi et al. | |

FOREIGN PATENT DOCUMENTS

| | | | | |
|---|---|---|---|---|
| WO | 2007056775 | A2 | 5/2007 | |
| WO | 2007065899 | A1 | 6/2007 | |
| WO | 2008082691 | A2 | 7/2008 | |
| WO | 2009118526 | A2 | 10/2009 | |
| WO | WO 2009118526 | * | 10/2009 | ............. H01M 4/50 |

OTHER PUBLICATIONS

Toupin, Brousse, and Belanger. "Influence of Microstructure on the Charge Storage Properties of Chemically Synthesized Manganese Dioxide." Chem. Mater. 2002, 14, 3946-3952.*

Patent Cooperation Treaty (PCT), International Search Report and Written Opinion for Application No. PCT/US2011/022555, filed Jan. 26, 2011, mailed May 13, 2011, European Patent Office, Netherlands.

Yang, Jingsi and Xu, Jun John, "Nanoporous emorphous manganese oxide as an electrocatalyst for oxygen reduction in alkaline solutions," Electrochemistry Communications, vol. 5, 2003, p. 306-311.

Zhang, Wei, et al., "Mechanochemical preparation and characterization of manganese dioxide," Journal of Functional Materials and Devices, vol. 13, No. 5, Oct. 2007, p. 415-420.

Ding, Yun-shuang et al., "Synthesis and catalytic activity of cryptomelane-type manganese dioxide nanomaterials produced by a novel solvent-free method," Chem. Matter, vol. 17, No. 21, 2005, p. 5382-5389.

Ding, Yun-shuang et al., "Solid phase synthesis of nanophase $MnO_2$ powders and its electrochemical properties", Journal of Applied Sciences, vol. 17, No. 2, Jun. 1999, p. 245-249.

* cited by examiner

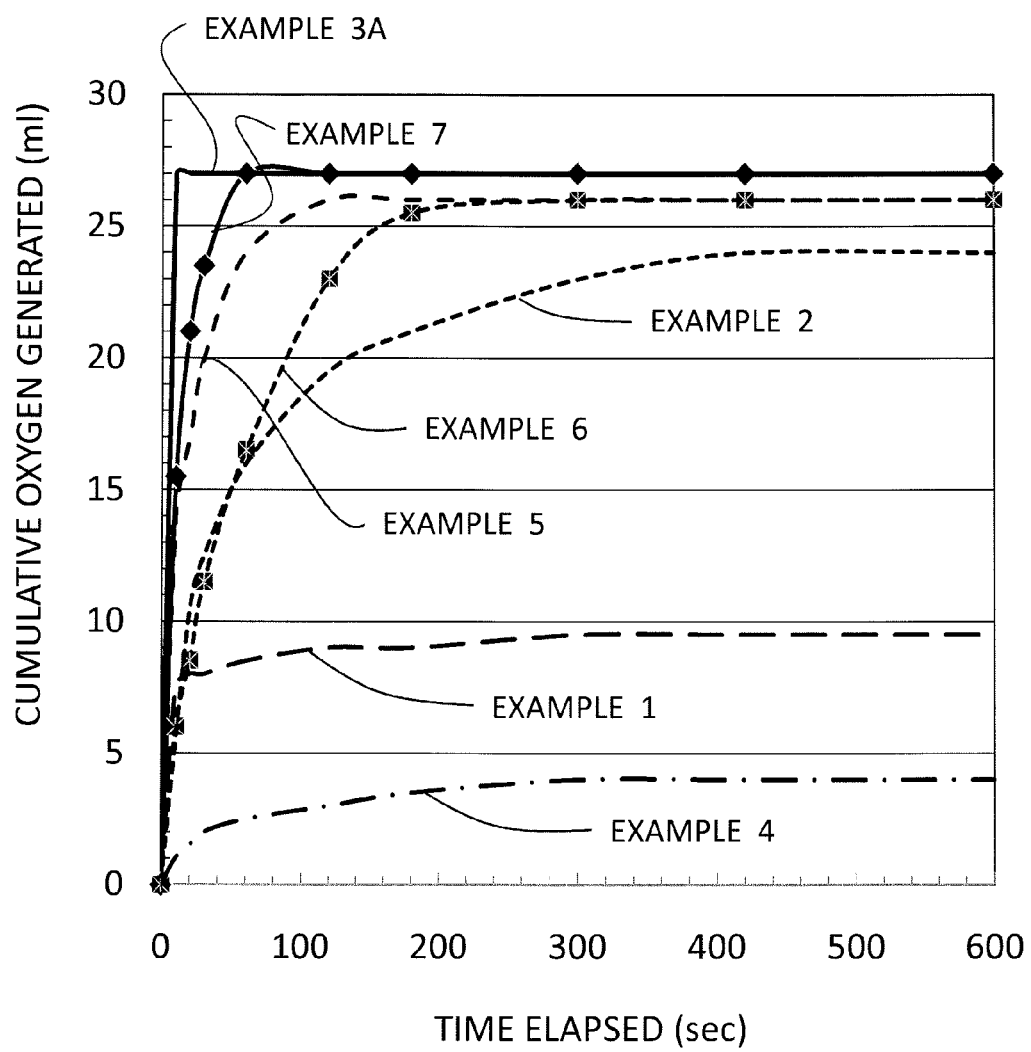

METHOD OF MAKING AN ELECTROCHEMICAL CELL WITH A CATALYTIC ELECTRODE INCLUDING MANGANESE DIOXIDE

CROSS REFERENCE TO RELATED APPLICATIONS

This application claims the benefit of U.S. Provisional Application No. 61/299,576, filed Jan. 29, 2010.

STATEMENT REGARDING FEDERALLY SPONSORED RESEARCH OR DEVELOPMENT

The U.S. Government has a paid-up license in this invention and has the right in limited circumstances to require the patent owner to license others on reasonable terms as provided by the terms of Contract No. N00014-08-C-0104, awarded by Office of Naval research.

BACKGROUND

This invention relates to a method of making an electrochemical cell, such as a fuel cell or a metal-air cell, with a catalytic electrode including a catalyst for reducing oxygen.

Electrochemical cells can be used to provide electric energy to operate electronic devices. When used to operate electronic devices, these cells are advantageous because they use oxygen from outside the cell as an active material, reducing the size of the electrode consuming the oxygen (e.g., the positive electrode, or cathode) and making more volume within the cell available for the counter electrode (e.g., the negative electrode, or anode) and electrolyte. A hybrid metal-air cell, sometimes referred to as an air-assisted cell, has positive and negative electrodes with active materials that are contained within the cell and an auxiliary catalytic electrode that reduces oxygen from outside the cell as an active material to recharge the primary positive electrode. Examples of fuel cells, metal-air cells and air assisted cells can be found in the following patent publications: U.S. Pat. No. 5,079,106; U.S. Pat. No. 5,229,223; U.S. Pat. No. 5,308,711; U.S. Pat. No. 5,378,562; U.S. Pat. No. 5,567,538; U.S. Pat. No. 6,383,674; U.S. Pat. No. 6,461,761; U.S. Pat. No. 6,602,629; U.S. Pat. No. 6,911,278; U.S. Pat. No. 7,001,689; US 2004/0197641 and US 2009/0214911; and in International Patent Publication No. WO 00/36677.

Fuel cells, metal-air cells and air assisted cells include a catalytic electrode containing a catalyst for reducing oxygen from outside the cell, and a product of the oxygen reduction reaction reacts with the active metal in the counter electrode (e.g., the negative electrode in fuel cells and metal-air cells or the primary positive electrode in air assisted cells). The properties of the catalyst can affect the electrical performance of the cell. Improved cell performance, such as greater discharge capacity or better high rate and high power discharge capability, is desirable.

Manganese oxides are known as oxygen reduction catalysts, and many types of manganese oxides have been used as catalysts in metal-air cells, both alone and in combination with other catalysts such as silver and platinum metal. The manganese oxides can include manganese in a range of valences, either primarily a single valence or multiple valences. A variety of methods of making manganese oxides for use as catalysts are also known. Manganese oxides are desirable as catalysts because they can have good catalytic activity for the reduction of oxygen, they can be relatively inexpensive, and they can be relatively inexpensive to manufacture. However, many of the processes used to make manganese oxides for use in metal-air cells have disadvantages.

JP 51-071,299 A discloses a method of preparing an activated manganese dioxide catalyst from potassium permanganate and an acid solution of manganese nitrate. The method includes a solution precipitation process in which the reactions take place at 35° C. to 90° C. In this process the nitrate cation may participate in the oxidation-reduction reaction to produce nitrogen oxides that are undesirable from a safety and environmental standpoint. Acid, which can present a safety hazard, is also required.

US 2008/0176059 A1 discloses a composite material including a microporous or mesoporous matrix and nanoparticles of metal or metal oxide formed within the pores of the matrix. The process includes radiolytic reduction of a precursor solution with the pores of the matrix. The material includes a solid matrix material that may not be suitable for some cell constructions, the composite material is much more voluminous than just the catalyst, the irradiation required can present safety and environmental concerns, and the process requires heating and a vacuum.

U.S. Pat. No. 6,632,557 B1 discloses a cathode for a metal-air electrochemical cell that includes both manganese dioxide and silver as oxygen reduction catalysts. The catalyst is prepared by a solution precipitation process using silver permanganate as an oxidizing agent and carbon as a reducing agent in water or isopropanol to form the catalyst on the surfaces of the carbon particles. An additional reducing agent such as hydrazine or hydroxylamine can be used. The catalyst is compared to catalysts made from each of manganese nitrate, a combination of silver nitrate and manganese nitrate, and potassium permanganate. The relatively high cost of silver permanganate, difficulty in achieving a uniform mixture and product due to the insolubility of carbon, large volume of liquid needed due to the limited solubility of silver permanganate can be disadvantages.

U.S. Pat. No. 6,780,347 B2 discloses a method of making a catalyst that can be used in a metal-air cell. The catalyst contains manganese oxides, including manganese dioxide, by reacting potassium permanganate and an organic or inorganic reducing agent (e.g., sodium formate, formic acid or formaldehyde) in an aqueous solution to form a sol, and then mixing the sol with a carbon slurry and Teflon dispersion. The reaction temperature can range from 25° C. to 100° C. The presence of impurities and undesirable reaction products in the sol, which is mixed directly with carbon, can be a disadvantage, and the type of manganese oxide catalyst can vary depending on the reaction temperature.

A manganese oxide that is safe, easy and inexpensive to make and that can be readily incorporated into a catalytic electrode for a fuel cell, metal-air cell or air assisted cell that provides excellent cell performance is desirable.

SUMMARY

The above objects are met and disadvantages of the prior art are overcome by the present invention. Accordingly, one aspect of the present invention is a process for making an electrochemical cell including the steps:

(a) preparing an oxygen reduction catalyst via an oxidation-reduction reaction at less than 65° C. in a reaction mixture having a solvent comprising water, an oxidizing agent whose cation is not reduced in the reaction, and a reducing agent whose anion is not oxidized or reduced in the reaction, wherein the oxidizing agent includes no component that is insoluble in the solvent, the reducing agent includes no component that is insoluble in the solvent, and at least one of the oxidizing agent and the reducing agent includes manganese;

(b) precipitating the catalyst;
(c) preparing a catalytic mixture containing the catalyst;
(d) forming the catalytic mixture into a catalytic layer;
(e) preparing a catalytic electrode comprising the catalytic layer; and
(f) combining the catalytic electrode with a counter electrode and an electrolyte, with a separator between the catalytic layer of the catalytic electrode and the counter electrode, in a housing having an oxygen entry port, wherein the catalytic electrode is accessible to air entering the cell through the air entry port.

Embodiments of the invention can include one or more of the following features:

The reaction takes place at less than 45° C., preferably at less than 35° C., and more preferably at less than 30° C.
The reaction takes place at greater than 0° C., preferably at greater than 15° C.
The reaction takes place at 20° C. to 25° C.
The oxidizing agent includes a water soluble permanganate compound, preferably at least one of potassium permanganate and sodium permanganate, and more preferably potassium permanganate.
The reducing agent includes a water soluble manganese (II) compound, preferably at least one of manganese sulfate, manganese chloride and manganese acetate.
Acid neutralization is performed before forming the catalytic mixture.
No acid neutralization is performed before forming the catalytic mixture.
The step of preparing the catalyst takes place without heating the reaction mixture.
The step of preparing the catalyst includes cooling the reaction mixture.
The step of preparing the catalyst includes heating the reaction mixture.
The catalyst includes a manganese oxide with a molecular formula of $K_xMn_yO_z$, wherein x:y is from greater than 0:1 to 1:4 and y:z is from 1:2 to 1:4.
The manganese oxide is a hydrated manganese oxide.
The catalyst is a manganese oxide has a structure that is neither an amorphous structure nor an essentially cryptomelane structure.
The manganese oxide has two broad X-ray diffraction peaks, one centered at a 2-theta value of about 56 and one centered at a 2-theta value of about 107.
Most of the catalyst particles have an aspect ratio of about 1:1 to 2:1 and have a crystallite size less than 20 nm and preferably less than 10 nm, as calculated from X-ray diffraction.
The catalyst includes a manganese oxide and essentially no metal.
The step of preparing the catalytic mixture includes mixing the catalyst with a conductive material.
The conductive material comprises carbon, preferably a catalytic carbon.
The electrochemical cell is a metal-air cell.
Oxygen is an electrochemically active material that is reduced at the catalytic electrode, the counter electrode is a negative electrode including zinc as an electrochemically active material and the electrolyte is an aqueous alkaline electrolyte.
The electrochemical cell is a fuel cell using oxygen as an electrochemically active material that is reduced at the catalytic electrode and another gas as an electrochemically active material for the counter electrode.
The catalytic electrode further comprises a barrier layer that is oxygen permeable and impermeable to the electrolyte, and the barrier layer is disposed between the catalytic layer and the oxygen entry port.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

BRIEF DESCRIPTION OF THE DRAWINGS

In the drawings:

FIG. 3 is a plot of the amount of oxygen produced by the manganese dioxides in Examples 1, 2, 3A, 4, 5, 6 and 7 as a function of time on a peroxide decomposition catalytic activity test.

DESCRIPTION

Figure 1:
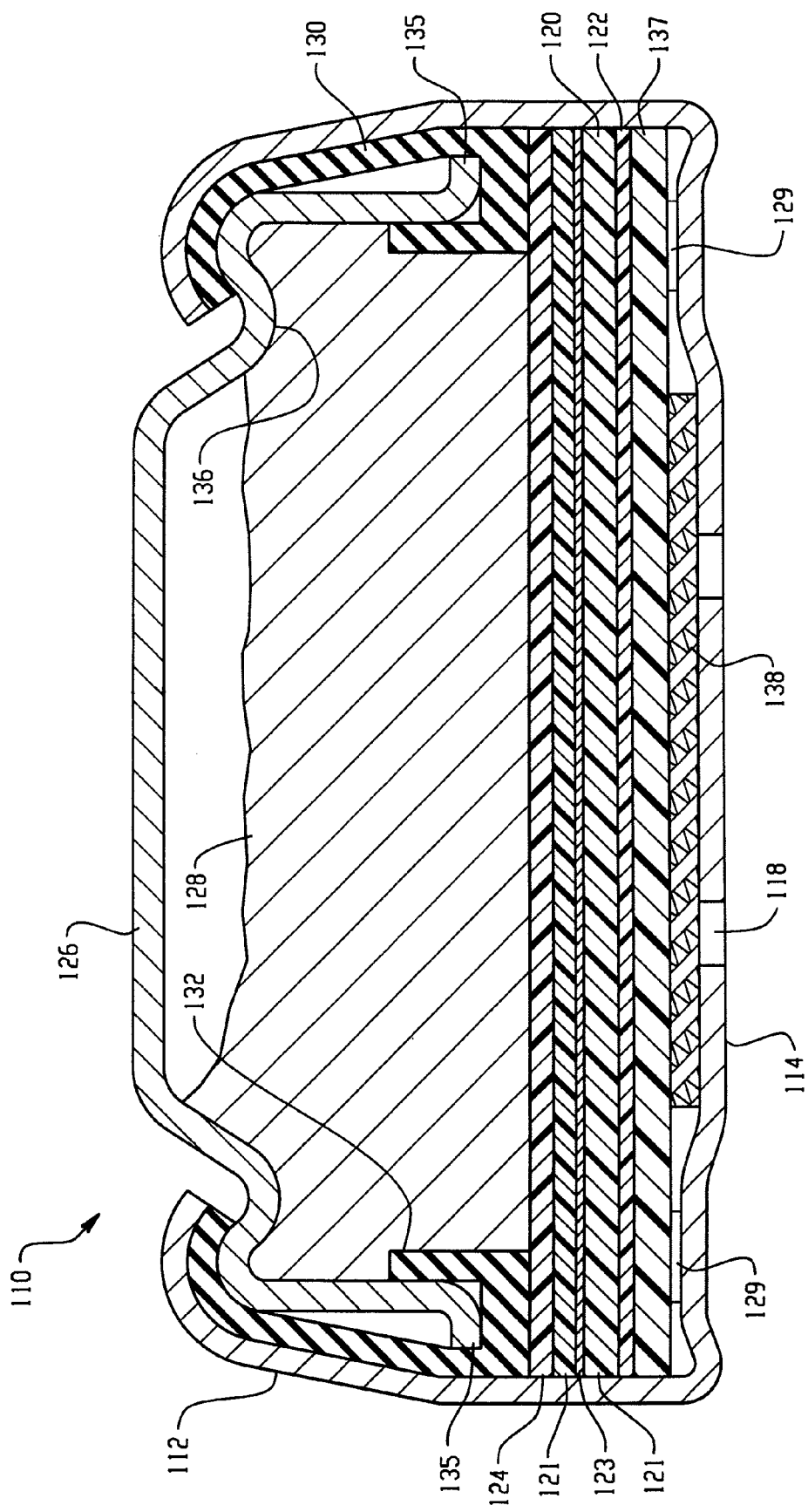
FIG. 1 is an elevational view, in cross-section, of a metal-air cell with a catalytic electrode.

An embodiment of the invention is a process for making an electrochemical cell including preparing a catalyst using an oxidation-reduction, solution precipitation process operated at a low temperature, using reactants that are easily mixed, do not produce materials that are unsafe or environmentally undesirable, do not produce substantial amounts of impurities that are difficult to remove. The process is simple, inexpensive, easily controlled and produces a catalytic material that provides a cell with excellent performance.

The invention can be used for a wide variety of electrochemical cells, including fuel cells, metal-air cells and air assisted cells. The cells can use a variety of materials as electrochemically active materials in the counter electrode, depending on the type and electrochemistry of the cell. The cells can range in size and shape, including thin, flat cells, button size cells and larger cylindrical and prismatic cells.

The cell includes a catalytic electrode for reducing oxygen that enters from outside the cell. The catalytic electrode includes a catalytic layer containing a catalyst. In some embodiments the catalytic electrode can include a barrier layer including a material that is permeable to oxygen, to allow oxygen to enter the catalytic electrode, and essentially impermeable to electrolyte, to keep electrolyte contained within the cell. The catalytic electrode can be the positive electrode of cell, or it can be an auxiliary electrode that is used to recharge the primary positive electrode during periods of low rate or no discharge. In some embodiments the catalytic electrode can include an electrically conductive current collector to reduce the internal resistance of the electrode or to provide better electrical contact between the catalytic electrode and other cell components. The current collector can be embedded into or coated or deposited onto the catalytic layer, the catalytic layer can be coated or laminated onto the current collector, or the catalytic layer and the current collector can be otherwise joined together.

The cell also includes a counter electrode containing an electrochemically active material or a catalytic counter electrode using a fluid from outside the cell as an active material.

An ionically conductive, electrically nonconductive separator isolates the catalytic electrode from the counter electrode. The separator can be a single layer or multiple layers of material. Where the electrolyte includes a liquid, at least one layer of the separator will generally retain some electrolyte to facilitate transport of ions between the electrodes.

The cell includes a sealed housing in which the electrodes and electrolyte are contained. The housing includes one or more oxygen entry ports to allow oxygen to enter from outside the cell and reach the catalytic electrode. A barrier layer can be disposed on the surface or surfaces of the catalytic electrode accessible to air entering the cell through the oxygen entry ports. The barrier layer can cooperate with the housing to prevent electrolyte from reaching the oxygen entry ports.

An example of an electrochemical cell according to the invention is shown in FIG. 1. The cell 110 can include a cathode casing 112 and an anode casing 126. At least aperture 118 is present in the cathode casing 112 to act as an air or oxygen entry port. A catalytic positive electrode (such as an air electrode) 120 is disposed near the aperture 118 in the cathode casing 112. The catalytic electrode 120 can include a catalytic layer containing a mixture of carbon, a catalyst, and a binder. Catalytic electrode 120 preferably has a barrier layer 122 laminated thereon. The barrier layer 122 can be laminated on the side of the catalytic electrode closest to the aperture 118 cell. Catalytic electrode 120 can contain an electrically conductive current collector 123 embedded therein, preferably on the side of the electrode opposite the barrier layer 122. The cell 110 may optionally contain a second barrier layer 137 between the first barrier layer 122 and central region 114 of the surface of the cathode casing 112 containing the aperture 118. The barrier layers 122, 137 have a low enough surface tension to be resistant to wetting by electrolyte, yet porous enough to allow oxygen to enter the electrode at a rate sufficient to support the desired maximum cell reaction rate. At least one layer of separator 124 is positioned on the side of the catalytic electrode 120 facing the anode 128. The separator 124 is ionically conductive and electrically nonconductive. The total thickness of the separator 124 is preferably thin to minimize its volume, but must be thick and strong enough to prevent short circuits between the anode 128 and catalytic electrode 120. The separator 124 can be adhered to the surface of the catalytic electrode 120 to provide good ion transport between the electrodes and to prevent the formation of gas pockets between the catalytic electrode 120 and the separator 124. Similarly, adjacent layers of the separator 124 can be adhered to each other. A layer of porous material 138 can be positioned between catalytic electrode 120 and the surface of casing 112 to evenly distribute oxygen to electrode 120. A sealant 129 can be used to bond portions of the catalytic electrode 120 to the cathode casing 112. The anode casing 126 can have a rim 135 that is flared outward at its open end. Alternatively, a cell can essentially straight side walls with little or no outward flare or a rim that is folded outward and back along the side wall to form a substantially U-shaped side wall with a rounded edge at the open end of the casing. The anode casing 126 can have in inner surface 136 in contact with the anode mixture 128 and electrolyte. Cell 110 can includes a gasket 130, made from an elastomeric material for example, to provide a seal between the cathode casing 112 and anode casing 126. The bottom edge of the gasket 130 can be formed to create an inwardly facing lip 132, which abuts the rim of anode casing 126. Optionally, a sealant may be applied to the sealing surfaces of the gasket 130, cathode casing 112 and/or anode casing 126. A suitable tab (not shown) can be placed over the openings 118 until the cell 110 is ready for use, to keep air from entering the cell 110 before use.

The counter electrode contains an electrochemically active material. In an air assisted cell the counter electrode is the primary positive electrode of the cell and its electrochemically active material can be one or more metal oxides such as manganese dioxide, nickel oxyhydroxide or silver oxide. The discharge reaction product of the active material is re-oxidized (recharged) by the reaction product from the catalytic electrode. In other types of cells the catalytic electrode is the positive electrode and the counter electrode is the negative electrode of the cell. The electrochemically active material in the negative electrode of a fuel cell can be a gas that is oxidized during discharge of the cell; examples include hydrogen, methanol and ethanol. In a metal-air cell the electrochemically active material in the negative electrode is a metal that can be oxidized such as zinc, lithium, aluminum or magnesium. The counter electrode can include other components such as electrolyte, a binder or gelling agent, additives to reduce unwanted gas generation and additives to enhance cell performance.

The type of electrolyte used can vary depending on the electrochemistry of the cell and the type of active material in the counter electrode. For example, an aqueous alkaline electrolyte (e.g., containing potassium hydroxide or sodium hydroxide) can be used in zinc-air cells; a saline electrolyte can be used in an aluminum-air cell or a magnesium-air cell; and either an aqueous alkaline or a nonaqueous electrolyte can be used in a lithium-air cell. The electrolyte can include additives to reduce unwanted gassing in the cell or to improve cell discharge performance. In some types of cells the electrolyte can be a polymer electrolyte or a solid electrolyte.

The catalytic electrode includes a manganese oxide catalyst, as described in further detail below. The catalytic layer can also include one or more electrically conductive materials, preferably particulate materials, in addition to the catalyst to provide improved electrical conductivity within the catalytic layer. Examples of electrically conductive materials include metals such as silver, platinum and palladium, conductive polymers such as polyaniline and polypyrrole, and carbons such as carbon black, activated carbon and graphite. In some cases the electrically conductive material can also be a catalytic material that provides some catalytic activity for the reduction of oxygen. Catalytic carbon, such as activated carbon, is a preferred electrically conductive material. The catalytic layer can also include a binder. Examples of binders include fluoropolymers such as polytetrafluoroethylene, fluorinated ethylene propylene and polyvinylidene fluoride. In the cell, the catalytic electrode can also contain sufficient electrolyte to enable the reduction of oxygen by the catalyst and transport of the ions produced toward the counter electrode. The amount of electrolyte in the catalytic layer is generally limited so it will not block oxygen from reaching the catalyst throughout the catalytic layer.

The manganese oxide catalyst is made using a solution precipitation process with a reaction temperature less than 65° C. in order to produce a manganese oxide with the preferred composition, structure, morphology, particle size, specific surface area and catalytic activity. At and above 65° C. cryptomelane manganese dioxide is formed. It can be advantageous to heat the reaction mixture slightly to speed up the reaction, as long as the desired catalyst is produced. Preferably the reaction temperature is less than about 60° C., more preferably less than about 45° C., even more preferably less than about 35° C., and yet more preferably less than about 30° C. It can be advantageous to cool the reaction mixture to insure the desired catalyst is produced. The reaction temperature is desirably greater than 0° C. to prevent freezing of the reaction mixture, more preferably greater than about 15° C. It can be desirable to make the catalyst at about room temperature (about 20° C. to about 25° C.). In some embodiments the catalyst is made without substantially heating or cooling the reaction mixture. Ultrasound can be used to reduce the reaction time. It is desirable to keep the reaction time at 30 minutes or less to obtain the desired manganese dioxide.

The starting materials for the preparation of the catalyst include an oxidizing agent and a reducing agent that will react in an oxidation-reduction reaction in an aqueous solvent. Both the oxidizing agent and the reducing agent can include one or more components, and all components of the oxidizing agent and the reducing agent must be soluble in the solvent. By using only soluble oxidizing and reducing agents, unused reactants can be easily removed from the catalyst, by filtering for example. The oxidizing agent and reducing agent are also selected so that no oxidizing agent cation is reduced and no reducing agent anion is oxidized or reduced in the reaction. This avoids undesirable reaction products that may be undesirable for safety or environmental reasons or that may be impurities in the catalyst that can dilute the catalyst or be otherwise undesirable in the cell. At least one component of the oxidizing agent, the reducing agent or both the oxidizing agent and the reducing agent includes manganese. Preferably all of the reactants include manganese. Examples of suitable oxidizing agent components are water soluble permanganate compounds, such as potassium permanganate, sodium permanganate and potassium persulfate ($K_2S_2O_8$). Potassium permanganate is preferred. Examples of suitable reducing agent components are water soluble manganese (II) compounds such as manganese sulfate, manganese chloride and manganese acetate and sucrose.

The solvent is preferably an aqueous solvent. It can consist of only water, or it be an aqueous solution including one or more water soluble or water miscible materials, such as acids, bases and alcohols. Nonaqueous solvents, such as solvents containing an alcohol (e.g., ethanol), can be used.

The reactants are mixed with the solvent and reacted at a temperature low enough to produce the desired manganese oxide catalyst. The catalyst precipitates from the solution and is separated, by filtering or by evaporating the solvent for example. Filtering can be advantageous because soluble materials are removed with the solvent; further washing and filtering can be done to further purify the catalyst. The catalyst can then be dried, preferably at a temperature within the range from about room temperature to about 110° C., preferably no greater than about 50° C. Too much heat may cause excessive agglomeration of the catalyst particles or even changes in the structure of the catalyst. Vacuum drying can be used to avoid undesirable high temperatures. The dried catalyst can be ground or milled to break agglomerated particles into smaller particles.

The desired manganese dioxide catalyst is preferably nominally manganese dioxide. A small amount of cation from the reactants may also be present. Potassium is a desirable cation that can be present when a reactant containing potassium, such as potassium permanganate, is used. A preferred molecular formula for the catalyst is $K_xMn_yO_z$, wherein the ratio of y:z is from about 2:1 to 4:1, preferably at least about 3:1, and the ratio of x:y is greater than 0:1 but not greater than about 1:4, preferably at least about 1:16 to about 1:8. The catalyst can be a hydrated manganese oxide, such as $K_xMn_yO_z \cdot 1.2H_2O$. A small amount of other manganese oxides may be also be present.

The structure of the desired catalyst is neither highly crystalline nor completely amorphous. Preferably the catalyst contains less than one weight percent and preferably essentially no cryptomelane manganese dioxide. The X-ray diffraction pattern of the desired catalyst preferably has two broad peaks, one centered at a 2-theta value of about 56 and one centered at a 2-theta value of about 107.

The primary (unagglomerated) particles are generally roughly spherical in shape (i.e., a majority of the primary particles have aspect ratios from about 1:1 to 2:1), as determined by SEM/TEM microscopy (a combination of scanning electron microscopy and transmission electron microscopy). Preferably the majority of the primary particles have a maximum dimension less than 100 nm, more preferably no greater than 50 nm and most preferably no greater than 20 nm, as determined by SEM/TEM microscopy. Preferably the crystallites are less than about 20 nm and more preferably less than about 10 nm, as calculated from X-ray diffraction, based on measurement of the full-width at half maximum (FWHM) for the peak at approximately 107° 2θ and calculation using the Scherrer equation: $t=(0.9\lambda)/(\beta \cos \theta)$; where t is the crystallite size in nm normal to the crystallographic planes producing the peak, λ is the wavelength in nm of the X-rays, β is the FWHM in radians of the peak corrected for instrumental broadening, and θ is half the 2θ peak position. The corrected peak width β can be calculated from the equation $\beta=[(B-b)*(B^2-b^2)^{1/2}]^{1/2}$, where B is the FWHM of the peak in radians and b is the FWHM in radians of an instrumental broadening peak from a NIST alumina standard with a peak position near the uncorrected measured peak.

Preferably the BET specific surface area of the catalyst is from about 120 $m^2/g$ to about 300 $m^2/g$ (Brunauer, Emmett, Teller specific surface area, using nitrogen adsorption). More preferably the BET specific surface area is at least about 150 $m^2/g$. In some instances it may be desirable for the BET specific surface area to be no greater than about 200 $m^2/g$. The small size and high surface area of the catalyst particles can be advantageous in achieving high catalytic activity and uniform distribution of the catalyst within the catalytic mixture and the catalytic layer of the electrode.

The catalyst can be mixed with the conductive material to form a catalytic mixture. Alternatively, the catalyst can be used with an electrically conductive current collector, such as by depositing the catalyst on the current collector or by embedding a current collector into a formed catalytic body. A binder can be used. If desired, additives can be included. In one embodiment the ratio of catalyst to conductive material is from about 1 to 40 percent by weight, preferably from about 1 to 15 weight percent, more preferably from about 1 to 10 weight percent, and most preferably from about 1 to 5 weight percent. Any suitable process can be used to mix the ingredients of the catalytic mixture. The ingredients can be dry mixed, or the dry ingredients can be mixed with a liquid. Examples of mixing processes are disclosed in US Patent Publication No. 2008/0155813 A1.

The shape and dimensions of the catalytic layer can vary, depending on the type and size of the cell. For example, the catalytic layer can be in the form of a flat sheet or belt, or a solid or hollow cylindrical or prismatic shape. The catalytic mixture can be formed into a catalytic layer using any suitable process.

The catalytic electrode includes the catalytic layer. It can include a barrier layer, such as a barrier sheet or coating. The barrier layer can be combined with the catalytic layer in any suitable manner, such as by pressure or adhesive lamination, coating, roll coating or co-extrusion. The catalytic electrode can include a current collector. The catalytic layer and the current collector can be combined in any suitable manner, such as forming the catalytic layer around or on a surface of the current collector, embedding the current collector into the catalytic layer, coating the current collector onto a surface of the catalytic layer or laminating the catalytic layer and the current collector together. The current collector can be prepared as disclosed in U.S. Patent Application Ser. No. 61/182,285, filed May 29, 2009.

The catalytic electrode can be combined with a counter electrode in any suitable manner, with a separator disposed between the electrodes. The type of separator can depend on the shape and size of the electrodes, whether the counter electrode is a solid electrode or a gelled electrode, the active material in the counter electrode and the type of electrolyte used.

The electrodes and electrolyte are sealed in a suitable housing. The type of housing is not limited. For example, the housing can be a flexible pouch sealed around the peripheral edges, a metal can and cover with an elastomeric gasket or seal forming a compression seal between the can and cover, and a plastic casing sealed using ultrasonics or an adhesive.

Examples of zinc-air cell components, materials and cell manufacturing processes that can be used in conjunction with the present invention are disclosed in US Patent Publication No. 2008/0155813 A1.

Example 1

Conventional manganese oxide ($MnO_x$) catalyst containing a mixture of $Mn_2O_3$ and $Mn_3O_4$ was provided.

Example 2

Nano-manganese oxide (QSI-NANO® Manganese manganese dioxide powder), as disclosed in U.S. Patent Application Publication No 2008/0280190, was procured from QuantumSphere, Inc. (QSI), Santa Ana, Calif., USA.

Example 3

Cryptomelane manganese dioxide was made by refluxing manganese sulfate (Example 3A) and potassium permanganate in an aqueous acid solution in a process similar to the reflux method disclosed in US Patent Publication No. 2007/0111095 A1. $MnSO_4.H_2O$ (13.52 g) was dissolved in deionized water (80 cc) and $KMnO_4$ (8.8 g) was dissolved in deionized water (300 cc). The pH of the $MnSO_4$ solution was adjusted to about 1.0 with nitric acid; the $KMnO_4$ solution was slowly added while maintaining the pH at about 1.0; the combined solution was refluxed at about 100° C. for about 24 hours; and the resultant precipitate was filtered, washed and dried at room temperature. Cryptomelane manganese dioxide was also made using the same procedure, except manganese acetate ($Mn(C_2H_3O_2)_2.4H_2O$) was used instead of manganese sulfate (Example 3B).

Example 4

Amorphous manganese dioxide was made from disodium fumarate and sodium permanganate monohydrate using a process similar to that disclosed by Yang et al., in "Nanoporous amorphous manganese oxide as electrocatalyst for oxygen reduction in alkaline solutions," Electrochemistry Communications 5 (2003) 306-311. A 0.3 M solution of disodium fumarate was added slowly to a 0.25 M sodium permanganate monohydrate solution (3:10 molar ratio) and stirred for 1 hour; sulfuric acid was added to initiate the disproportionation reaction to convert Mn(IV) to Mn(III) ions and form colloidal manganese dioxide particles and soluble Mn(II) ions; impurity ions were removed by dialysis; the precipitate was filtered and freeze dried, then heated at greater than 300° C.

Example 5

Mesophase manganese dioxide was made using a solution precipitation process using potassium permanganate and manganese acetate in water, without heating. $Mn(C_2H_3O_2)_2.4H_2O$ (13.52 g) was dissolved in deionized water (80 cc) and $KMnO_4$ (8.8 g) was dissolved in deionized water (300 cc). The pH of the resulting manganese acetate solution was adjusted to about 1.0 with nitric acid; the $KMnO_4$ solution was slowly added while maintaining the pH at about 1.0; the combined solution was stirred and allowed to react for various amounts of time, up to about 24 hours; and the resultant precipitate was filtered, washed and dried at room temperature.

Example 6

Mesophase manganese dioxide was made from manganese acetate and potassium permanganate using the solution precipitation process in Example 4, except that acid was not added to adjust the pH.

Example 7

Mesophase manganese dioxide was made from manganese sulfate and potassium permanganate using the solution precipitation process and in Example 5, except that manganese sulfate ($MnSO_4.H_2O$) was used instead of manganese acetate.

Example 8

Dried reaction products from Examples 1-6 were analyzed. Composition was determined by Energy-Dispersive X-Ray Spectrometry (EDS). Results for Examples 3A, 3B, 4 and 7 (24 hours reaction time) are shown in Table 1. For Example 7 the composition varied by a relatively small amount for reaction times from 5 minutes to 24 hours, with the weight percent potassium ranging from 1.74 to 1.93, averaging 1.83, and the weight percent manganese ranging from 47.4 to 52.8, averaging 50.3.

Figure 2A:
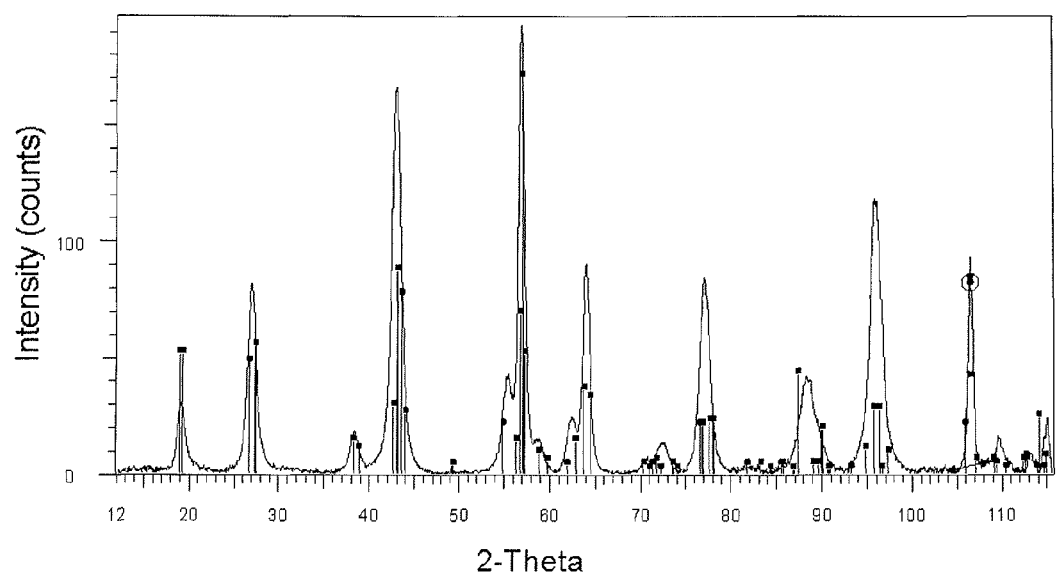
FIG. 2A is an X-ray diffraction pattern for a cryptomelane manganese dioxide.
Figure 2B:
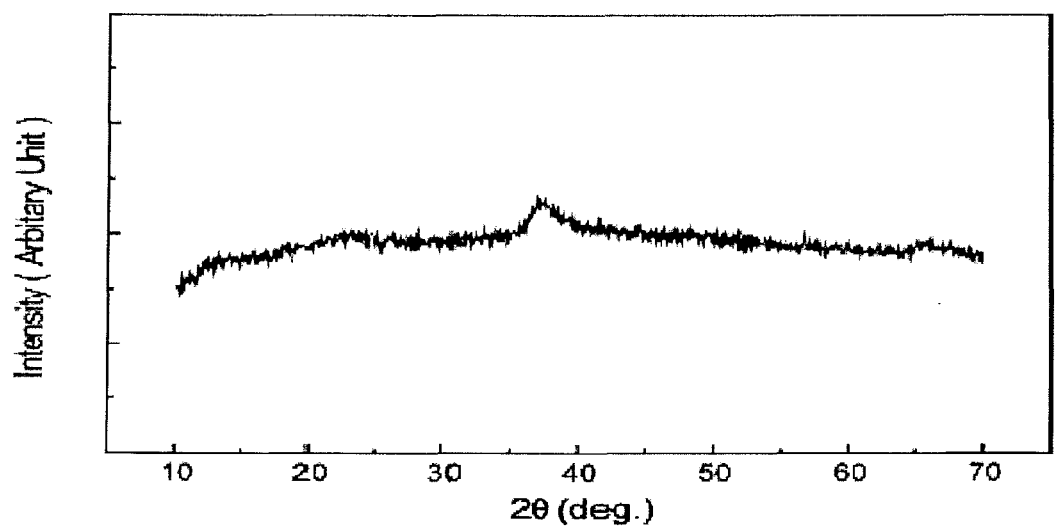
FIG. 2B is an X-ray diffraction pattern for an amorphous manganese dioxide.
Figure 2C:
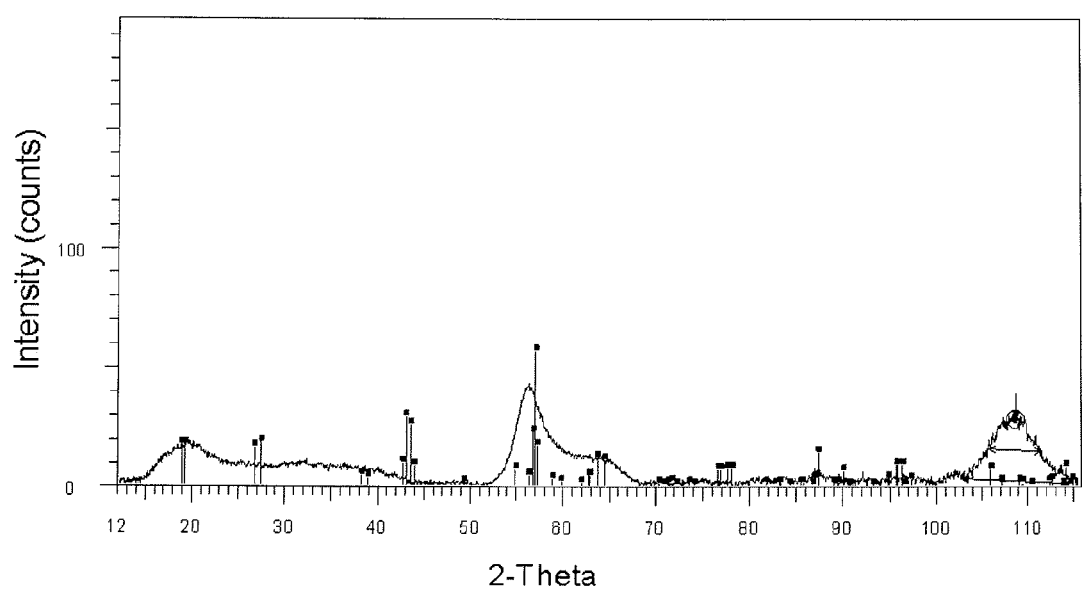
FIG. 2C is an X-ray diffraction pattern for a manganese dioxide that is neither highly crystalline nor amorphous.

Structure was determined by X-ray diffraction (XRD) using a Bruker D8 Discover diffractometer with GADDS detector. The X-ray tube was operated at 35 kV and 50 mA, to produce CrKα ($\lambda$=0.229 nm) radiation, which passed through a monochromator before entering the collimator with a diameter of 500 µm. The distance of the detector from the center of the goniometer was 10 cm. Diffraction patterns spanned a 2θ range of 15 degrees to 115 degrees, collected over three frames, each 15 minutes long. Material samples were oscillated at ±1 mm in the x-y plane during frame collection. Results for Examples 2A are summarized in Table 1. The X-ray diffraction patterns for Examples 2, 3A and 7 (24 hours reaction time) are shown in FIGS. 2A, 2B and 2C, respectively. The vertical bars in FIG. 2A represent the pattern for Cryptomelane-M, JCPDS No. 44-1386 (Joint Committee for Powder Diffraction Standards).

Morphology and size of the primary manganese oxide particles was determined by visual observation and measurement of SEM and TEM photographs at magnifications of 20,000 to 2,000,000 times. Results for Examples 3A, 3B, 4 and 7 (reaction time 24 hours) are summarized in Table 1. For Example 7, the morphology and size of the primary particles was similar for all reaction times. Example 7 was similar to Example 5 for a reaction time of 5 minutes, but rods up to about 200 nm long were observed in the sample with a reaction time of 24 hours, indicating that some more crystalline material had also been formed.

Surface area was BET specific surface area, using nitrogen adsorption. Results for Examples 3A, 3B, 4 and 7 (reaction time 24 hours) are summarized in Table 1. For Examples 4, 5 and 6, the surface area varied considerably, with no apparent correlation between reaction time and surface area.

The catalytic activity was determined using a peroxide decomposition test in which oxygen gas evolution rate was measured after adding $H_2O_2$ to a fixed amount of sample. The higher the gassing rate, the more effective the catalyst is. The following procedure was used for each test:

(a) a 0.1 gram sample of catalyst was placed in a two-necked flask, followed by 1 ml of isopropyl alcohol, then 1 ml of 33 weight percent aqueous KOH solution, then 60 ml of distilled water;

(b) one neck of the flask was sealed with a septum and the other was closed with a stopper fitted with a tube connected to the top of a graduated container containing oil for measuring the volume of oil displaced by gas from the flask;

(c) 200 μl of $H_2O_2$ was dispensed with a syringe through the septum into the flask;

(d) the volume of oil displaced was recorded at intervals until there was no further change in the volume of oil displaced.

Results of the peroxide decomposition test are summarized for Examples 3A, 3B, 4 and 7 (24 hour reaction time) in Table 1. The results for Examples 1, 2, 3A (reaction time 24 hours), 4, 5 (reaction time 24 hours, 6 (reaction time 24 hours) and 7 (reaction time 24 hours) are shown in FIG. 3, which is a plot of the volume of oxygen produced in $cm^3$ as a function of time in seconds.

time for Examples 5 and 6, though in Example 6 a slight reduction was observed with a reaction time of 24 hours. Example 7 generally showed no correlation between reaction time and catalytic activity, though reduced catalytic activity was observed with a reaction time of 24 hours in some testing. It was also observed in additional investigation that if the method described in Example 4 is used, but the reaction takes place at 65° C., the resultant manganese dioxide has a cryptomelane structure. In general, short reaction times and low temperatures are preferred.

Example 9

Catalytic electrodes were made with catalyst material from Examples 1, 2, 3A, 3B and 7. Catalytic mixtures were made by uniformly mixing catalyst, activated carbon, PTFE dispersion and water, and then drying the mixture to provide a dry mix containing 2.5 weight percent catalyst, 7 weight percent PTFE and 90.5 weight percent activated carbon.

Catalytic electrode sheets were made using each of the catalytic mixtures. Each catalytic mixture was compressed between rollers to form a catalytic layer sheet. A sheet of polytetrafluoroethylene film was pressure laminated onto one surface of the catalytic layer using a woven silk interleaf between the film and the adjacent pressure roller. An expanded nickel current collector was embedded into the opposite surface of the catalytic layer.

Example 10

Electrodes from Example 9, using catalysts from Examples 1, 2, 3A, 3B and 7, were tested in a half cell fixture with a platinum counter electrode and a zinc reference electrode and flooded with 33 weight percent KOH electrolyte. Each electrode was conditioned by testing for open circuit voltage, followed by AC impedance, with a peak-to-peak potential amplitude of 10 mV, over a frequency range of 65 kHz to 0.1 Hz, followed by a potential dynamic scan in the cathodic direction, beginning at 0.25 V above the open circuit

TABLE 1

| Characteristic | Example 3A | Example 3B | Example 4 | Example 7 (reaction time 24 hours) |
|---|---|---|---|---|
| Composition | $K_{0.91}Mn_8O_{16} \cdot 1.2\ H_2O$ | $K_{0.59}Mn_8O_{16} \cdot 1.2\ H_2O$ | $Na_{0.10}MnO_{1.96} \cdot 0.7\ H_2O$ | $K_{0.79}Mn_8O_{16} \cdot 1.1\ H_2O$ |
| Structure | Cryptomelane | Cryptomelane | Nearly Amorphous | Intermediate* |
| Morphology | Generally rod-like (aspect ratio about 1:10 to about 1:16) | Generally rod-like (aspect ratio about 1:10 to about 1:16) | Generally irregular shapes | Generally spherical (aspect ratio about 1:1 to about 2.2) |
| Primary Particle Size | 250 to 400 nm × 25 nm | 250 to 400 nm × 25 nm | about 50 to 100 nm across | about 5 to 10 nm across |
| Specific Surface Area | 53.1 $m^2/g$ | 87.3 $m^2/g$ | 350 $m^2/g$ | 122 $m^2/g$ |
| Catalytic Activity | 27 cc $O_2$ after 10 seconds; 27 cc $O_2$ after 10 minutes | | 1 cc $O_2$ after 10 seconds; 4 cc $O_2$ after 10 minutes | 25.5 cc $O_2$ after 10 seconds; 26.5 cc $O_2$ after 10 minutes |

*Intermediate = neither highly crystalline nor amorphous, with broad peaks centered at 2θ values of about 56 and about 107

The results showed catalyst from Examples 5, 6 and 7 (each made using a solution precipitation process from a water soluble oxidizing agent whose cation is not reduced and a water soluble reducing agent whose anion is not reduced) to have catalytic activity better than catalysts from Examples 1, 2, and 4 and nearly as good as catalyst from Example 3A. Catalytic activity tended to improve slightly with reaction voltage and scanning at 1 mV/second to 0.7 V vs. the reference electrode. After conditioning, the electrodes were allowed to rest open circuit for 30 minutes, and the AC impedance and potential dynamic scan tests were repeated. A polarization curve (similar to a Tafel curve, but with a linear scale rather than a log scale for current density) was plotted. The results are summarized in Table 2.

TABLE 2

| | Catalyst Example | | | | |
|---|---|---|---|---|---|
| | 1 | 2 | 3A | 3B | 7 |
| CCV at 10 mA (volts) | 1.317 | 1.373 | 1.373 | 1.358 | 1.373 |
| CCV at 100 mA (volts) | 1.203 | 1.256 | 1.264 | 1.241 | 1.269 |
| Tafel slope (mV/dec) | 54 | 49 | 44 | 44 | 48 |
| Maximum power density (W/cm$^2$) | 0.231 | 0.277 | 0.191 | 0.171 | 0.313 |
| CCV at maximum power (volts) | 0.940 | 0.906 | 1.094 | 1.031 | 0.887 |
| Limiting current at 1.05 V (A/cm$^2$) | 0.204 | 0.244 | 0.178 | 0.154 | 0.273 |

This testing showed that electrodes made with the catalyst from Example 7 to have the highest limiting current. The results with catalyst from Examples 3A and 3B were much poorer than expected from the catalytic activity of the catalysts (Example 8), so additional catalytic mixtures and electrodes were made and half-cell testing was repeated using catalyst from Examples 3A and 7. The half-cell testing was the same except that forced air convection was used to remove depletion of oxygen in the air in the vicinity of the air electrode as a limiting factor. These results, summarized in Table 3, are consistent with the catalytic activity test results in Example 8 and show catalyst from Example 3A can provide a limiting current better than catalyst from Lot 2. The relatively small particle sizes of the catalyst from Example 7 may be a factor in providing an electrode with a high limiting current.

TABLE 3

| | Catalyst Example | | |
|---|---|---|---|
| | 2 | 3A | 7 |
| CCV at 10 mA (volts) | 1.356 | 1.370 | 1.375 |
| CCV at 100 mA (volts) | 1.236 | 1.261 | 1.275 |
| Tafel slope (mV/dec) | 57 | 54 | 53 |
| Maximum power density (W/cm$^2$) | 0.499 | 0.535 | 0.562 |
| CCV at maximum power (volts) | 0.645 | 0.728 | 0.738 |
| Limiting current at 1.05 V (A/cm$^2$) | 0.302 | 0.352 | 0.385 |

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A process for making an electrochemical cell comprising the steps:
    (a) preparing an oxygen reduction catalyst via an oxidation-reduction reaction at less than 65° C. in a reaction mixture having a solvent comprising water, an oxidizing agent whose cation is not reduced in the reaction, and a reducing agent whose anion is not oxidized or reduced in the reaction, wherein the oxidizing agent comprises no component that is insoluble in the solvent, the reducing agent comprises no component that is insoluble in the solvent, and at least one of the oxidizing agent and the reducing agent comprises manganese;
    (b) precipitating the catalyst, wherein the catalyst has a crystallite size less than 10 nm, as calculated from X-ray diffraction using a CrKα radiation source, based on a full width at half maximum for a peak at a 2-theta value of 107° using a Scherrer equation;
    (c) preparing a catalytic mixture from the catalyst;
    (d) forming the catalytic mixture into a catalytic layer;
    (e) preparing a catalytic electrode comprising the catalytic layer; and
    (f) combining the catalytic electrode with a counter electrode and an electrolyte, with a separator between the catalytic layer of the catalytic electrode and the counter electrode, in a housing comprising an oxygen entry port, wherein the catalytic electrode is accessible to air entering the cell through the air entry port,
    wherein the catalyst comprises a manganese oxide comprising a molecular formula of $K_xMn_yO_z$, wherein x:y is from greater than 0:1 to 1:4 and y:z is from 1:2 to 1:4, and
    further wherein the catalyst comprises a majority of generally spherical particles having an aspect ratio of 1:1 to 2:1.

2. The process according to claim 1, wherein the reaction takes place at less than 45° C.

3. The process according to claim 1, wherein the reaction takes place at greater than 0° C.

4. The process according to claim 1, wherein the reaction takes place at 20° C. to 25° C.

5. The process according to claim 1, wherein the oxidizing agent comprises a water soluble permanganate compound.

6. The process according to claim 5, wherein the oxidizing agent comprises potassium permanganate.

7. The process according to claim 1, wherein the reducing agent comprises a water soluble manganese (II) compound.

8. The process according to claim 7, wherein the reducing agent comprises manganese acetate.

9. The process according to claim 7, wherein the reducing agent comprises manganese sulfate.

10. The process according to claim 1, wherein acid neutralization is performed before forming the catalytic mixture.

11. The process according to claim 1, wherein no acid neutralization is performed before forming the catalytic mixture.

12. The process according to claim 1, wherein the step of preparing the catalyst takes place without heating the reaction mixture.

13. The process according to claim 1, wherein the step of preparing the catalyst includes cooling the reaction mixture.

14. The process according to claim 1, wherein the step of preparing the catalyst includes heating the reaction mixture.

15. The process according to claim 1, wherein the manganese oxide is a hydrated manganese oxide.

16. The process according to claim 1, wherein the catalyst is a manganese oxide that has a structure that is neither an amorphous structure nor an essentially cryptomelane structure.

17. The process according to claim 16, wherein the manganese oxide comprises X-ray diffraction peaks at a 2-theta value of 56 and at a 2-theta value of 107.

18. The process according to claim 1, wherein the catalyst comprises a manganese oxide and essentially no metal.

19. The process according to claim 1, wherein the step of preparing the catalytic mixture comprises mixing the catalyst with a conductive material comprising carbon.

20. The process according to claim 19, wherein the carbon comprises a catalytic carbon.

21. The process according to claim 1, wherein the electrochemical cell is a metal-air cell.

22. The process according to claim 21, wherein oxygen is an electrochemically active material that is reduced at the catalytic electrode, the counter electrode is a negative electrode comprising zinc as an electrochemically active material and the electrolyte is an aqueous alkaline electrolyte.

23. The process according to claim 1, wherein the electrochemical cell is a fuel cell using oxygen as an electrochemically active material that is reduced at the catalytic electrode and another gas as an electrochemically active material for the counter electrode.

24. The process according to claim 1, wherein the catalytic electrode further comprises a barrier layer that is oxygen permeable and impermeable to the electrolyte, and the barrier layer is disposed between the catalytic layer and the oxygen entry port.

25. A process for making an electrochemical cell comprising the steps:
   (a) preparing an oxygen reduction catalyst via an oxidation-reduction reaction at less than 65° C. in a reaction mixture having a solvent comprising water, an oxidizing agent whose cation is not reduced in the reaction, and a reducing agent whose anion is not oxidized or reduced in the reaction, wherein the oxidizing agent comprises no component that is insoluble in the solvent, the reducing agent comprises no component that is insoluble in the solvent, and at least one of the oxidizing agent and the reducing agent comprises manganese;
   (b) precipitating the catalyst, wherein the catalyst has a crystallite size less than 10 nm, as calculated from X-ray diffraction using a CrKα radiation source, based on a full width at half maximum for a peak at a 2-theta value of 107° using a Scherrer equation;
   (c) preparing a catalytic mixture from the catalyst;
   (d) forming the catalytic mixture into a catalytic layer;
   (e) preparing a catalytic electrode comprising the catalytic layer; and
   (f) combining the catalytic electrode with a counter electrode and an electrolyte, with a separator between the catalytic layer of the catalytic electrode and the counter electrode, in a housing comprising an oxygen entry port, wherein the catalytic electrode is accessible to air entering the cell through the air entry port;
   wherein the reaction mixture consists essentially of a solvent comprising water, an oxidizing agent and a reducing agent, and that the solvent consists of water, an optional acid and an optional base, and
   further wherein the catalyst comprises a manganese oxide comprising a molecular formula of $K_xMn_yO_z$, wherein x:y is from greater than 0:1 to 1:4 and y:z is from 1:2 to 1:4, and the catalyst also comprises a majority of generally spherical particles having an aspect ratio of 1:1 to 2:1.

26. The process according to claim 25, wherein the solvent consists of water.

* * * * *